(12) United States Patent
Nguyen et al.

(10) Patent No.: US 7,935,241 B2
(45) Date of Patent: May 3, 2011

(54) SLURRIES FOR PRODUCING ALUMINIUM-BASED COATINGS

(75) Inventors: Thinh T. Nguyen, Onex (CH); Vittorio De Nora, Veyras (CH)

(73) Assignee: Rio Tinto Alcan International Limited, Montreal (CA)

( * ) Notice: Subject to any disclaimer, the term of this patent is extended or adjusted under 35 U.S.C. 154(b) by 697 days.

(21) Appl. No.: 11/885,528

(22) PCT Filed: Mar. 6, 2006

(86) PCT No.: PCT/IB2006/050697
§ 371 (c)(1),
(2), (4) Date: Aug. 31, 2007

(87) PCT Pub. No.: WO2006/095307
PCT Pub. Date: Sep. 14, 2006

(65) Prior Publication Data
US 2008/0135416 A1    Jun. 12, 2008

(30) Foreign Application Priority Data
Mar. 8, 2005  (WO) .................. PCT/IB2005/000634

(51) Int. Cl.
*C25C 3/08*  (2006.01)

(52) U.S. Cl. ........ 205/390; 205/379; 205/380; 205/372; 75/230; 75/232; 75/234; 75/235; 106/286.5; 106/287.1; 204/243.1; 204/247.3

(58) Field of Classification Search ............... 204/243.1, 204/247.3; 205/572, 575; 75/230, 232, 234, 75/235; 516/9; 106/286.5, 287.1
See application file for complete search history.

(56) References Cited

U.S. PATENT DOCUMENTS

| | | | |
|---|---|---|---|
| 6,338,785 B1 * | 1/2002 | de Nora et al. ............... 205/390 |
| 6,436,250 B1 * | 8/2002 | Sekhar et al. ............... 204/247.4 |
| 2003/0221955 A1 * | 12/2003 | Nora et al. ............... 204/247.4 |

* cited by examiner

*Primary Examiner* — Bruce F Bell
(74) *Attorney, Agent, or Firm* — Jayadeep R. Deshmukh

(57) ABSTRACT

A slurry comprises suspended aluminum particles in a colloid having dispersed colloidal particles of a metal oxide such as a hydroxide. The metal oxide is reducible by metallic aluminum. The slurry has such a basic pH that dissolution of the aluminum particles in the slurry is inhibited so that when the slurry is subjected to a heat treatment, the undissolved aluminum particles are reactable with the colloidal particles to form an aluminum-based mixture resistant to chemical attack made of aluminum oxide, metal aluminum and the metal of the colloidal particles. The slurry can be used to form an aluminum-based protective coating on a component, in particular of an aluminum electrowinning cell or an apparatus for treating molten aluminum.

25 Claims, No Drawings

SLURRIES FOR PRODUCING ALUMINIUM-BASED COATINGS

FIELD OF THE INVENTION

The invention relates to a slurry for producing aluminium-based coatings on components, in particular for use in aluminium electrowinning cells and in apparatus for treating molten aluminium.

BACKGROUND OF THE INVENTION

A number of activities, such as the production, purification and recycling of metals, in particular aluminium, are usually carried out at high temperature in very aggressive environments such as molten metal, molten electrolyte and/or corrosive gas. Therefore, the materials used for the manufacture of components exposed to such environments must be thermally and chemically stable.

Graphite and other carbonaceous materials are commonly used for components, especially conductive components. Several proposals have been made to reduce wear of carbon components in such technologies by making them aluminium-wetted so as to achieve a higher operation efficiency, reduce pollution and the costs of operation.

For the purification of molten aluminium, by the injection of a flux removing impurities towards the surface of the molten metal, it has been proposed to coat carbon components which are exposed to the molten metal with a coating of refractory material as disclosed in WO00/63630 (assigned to Moltech Invent S.A.).

In aluminium production, some components are exposed to molten fluoride-containing electrolyte and/or molten aluminium. In conventional Hall-Héroult cells these components are still made of consumable carbonaceous materials.

It has long been recognized that it would be desirable to make (or coat or cover) the cathode of an aluminium electrowinning cell with a refractory boride such as titanium diboride that would render the cathode surface wettable by molten aluminium which in turn would lead to a series of advantages.

For example, U.S. Pat. Nos. 5,310,476, 5,364,513, 5,651,874 and 6,436,250 (all assigned to Moltech Invent S.A.) disclose applying a protective coating of a refractory material such as titanium diboride to a carbon component of an aluminium electrowinning cell, by applying thereto a slurry of particulate refractory material and/or precursors thereof in a colloid in several layers with drying between each layer. WO01/42168, WO01/42531 and WO02/096831 (all assigned to Moltech Invent S.A.) disclose the use of a layer made of particulate oxide of Mn, Fe, Co, Ni, Cu, Zn, Mo or La (−325 mesh) mixed with refractory material and/or on a layer of refractory material. The use of these oxides promotes the wetting of the refractory material by reacting with molten aluminium. These patents also disclose the use of such materials for use in an oxidizing and/or corrosive environment.

U.S. Pat. No. 6,338,785 (assigned to Moltech Invent S.A.) discloses a method of protecting a carbon cathode during cell start-up against oxidation and/or corrosion by applying a start-up layer onto the cathode, in particular an aluminium foil or metallization. It is mentioned that a further layer can be applied to the cathode. The further layer can comprise various materials, inter-alia colloidal alumina, silica, yttria, ceria, thoria, zirconia, magnesia, lithia or monoaluminium phosphate. It is also mentioned that, in order to improve the conductivity of the further start-up layer, such layer may contain a particulate conductor for example particulate aluminium, nickel, iron, titanium, cobalt, chromium, zirconium or copper. Wettability of the cathode by aluminium is achieved by coating the cathode surface with a permanent aluminium-wettable refractory material underneath the start-up layers.

These materials have not as yet found wide commercial acceptance and there is a need to improve the aluminium-wettability of components used in a molten aluminium environment.

SUMMARY OF THE INVENTION

An object of the invention is to provide a slurry for producing a material which can be used to wet with molten aluminium components for use at elevated temperature in metallurgical environments, in particular in the production, purification or recycling of aluminium.

A particular object of the invention is to provide a method for producing an aluminium-based material for metallurgical applications, in particular in the field of aluminium production or treatment.

Another object of the invention is to provide an apparatus for the production, purification or recycling of aluminium, having such components and a method to operate such apparatus.

Therefore, the invention relates to a slurry for forming an aluminium-based protective coating on a component. This slurry comprises suspended aluminium particles in a colloid having dispersed colloidal particles of a metal oxide or a precursor thereof such as a hydroxide. The metal oxide is reducible by metallic aluminium. The slurry has such a basic pH that dissolution of the aluminium particles in the slurry is inhibited so that when the slurry is subjected to a heat treatment, the undissolved aluminium particles are reactable with the colloidal particles to form an aluminium-based mixture resistant to chemical attack made of aluminium oxide, metal aluminium and the metal of said colloidal particles.

In other words, the slurry according to the invention cumulates two features: it has a basic pH usually a pH of at least 9 or 9.5, in particular at least 10, so as to preserve the metallic aluminium particles from dissolving into the colloid; its colloidal metal oxide particles are reactable with aluminium when subjected to heat treatment, the metal of the colloidal particles may be selected from nickel, cobalt, iron, silicon, yttrium, cerium and thorium, or a mixture thereof. Usually, the slurry's pH will not exceed a value of 11.5, in particular 11.

In contrast, prior art slurries which have an acid pH dissolve the aluminium particles into the slurry which are converted into aluminium oxide upon drying. Oxide of aluminium does not react with the colloidal oxide to form a metallic aluminium-containing mixture nor does it wet any substrate to which it is applied. Depending on the colloidal oxide, a mixed oxide can be formed by sintering of aluminium oxide with the colloidal oxide.

In order to avoid formation of the aluminium oxide from the aluminium particles, the particles are maintained undissolved in the slurry and a all or nearly all particulate aluminium should remain in metallic form even upon drying so that it can melt upon heat treatment above the melting point of aluminium (about 660° C.) and react with the colloidal oxide to form the aluminium-based mixture.

To avoid—during a heat treatment of the slurry above the melting point of aluminium—the aggregation of colloidal oxide particles on the one hand and aggregation of metal aluminium on the other hand, the molten aluminium is reacted with the colloidal oxide particles to form a mixture of alumina, aluminium and the metal of the colloidal oxide particles. Therefore, it is important to use for the slurry colloidal oxide particles which are reactable with molten aluminium. For instance, colloidal alumina or aluminium hydroxide does not react with metallic aluminium and should be avoided, or used together with a colloidal oxide that is reactable with molten aluminium in accordance with the invention.

If necessary, the pH of the slurry can be adjusted as required, for example increasing it by adding $NH_3$ or $NH_4OH$ or decreasing it by using $NHO_3$.

Such a composition can be used to produce on a component a protective material that does not need an separate aluminization step before use, or a careful aluminization step in use during which the material is not exposed to a detrimental environment before sufficient protection by aluminization is achieved. This latter aspect is of particular importance when the component is placed into an aluminium electrowinning cell and exposed to a highly aggressive environment such as a fluoride-based electrolyte.

A molten aluminium-based surface layer forms spontaneously on the component during the heat treatment which renders the component wetted by molten aluminium and protects its from oxidation and/or corrosion. The heat treatment can be carried out well in advance or just prior to use of the component, for example above an aluminium electrowinning cell in operation.

In order to further preserve the aluminium particles, they can be encapsulated by an oxygen impervious material, in particular an organic material such as an acrylic material, to inhibit oxidation of the aluminium particles prior to heat treatment. The encapsulation can be carried out by the methods known in the art.

The dried layers usually contain: 30 to 70 wt % aluminium particles; and 0 to 2 wt % additives, the balance being the colloidal particles. In particular, the dried layers may contain 35 to 65 wt % aluminium, in particular 40 to 60 wt % such as 45 to 55 wt %. The additives may include at least one organic compound selected from ethylene glycol, hexanol, polyvinyl alcohol, polyvinyl acetate, polyacrylic acid, hydroxy propyl methyl cellulose and ammonium polymethacrylate and mixtures thereof.

The invention also relates to a method of forming an aluminium-based protective coating on an component. The method comprises the steps of: providing the above described slurry that contains aluminium particles and colloidal particles of a metal oxide; applying one or more layers of the slurry to a surface of the component; and drying the applied layer(s) to form the aluminium-based coating on the component. As indicated above, these aluminium particles and colloidal metal oxide particles are reactable during heat treatment before and/or during use of the component to form an aluminium-based mixture resistant to chemical attack made of aluminium oxide, metal aluminium and the metal of said colloidal particles on the component.

Typically, the applied layers have a total (cumulated) thickness in the range of 0.2 to 1 mm, in particular 0.4 to 0.7 mm.

Two to five layers of the slurry may be applied to the component surface to form the coating.

When a plurality of layers of the slurry are applied to the component surface, each layer may be allowed to dry in air at ambient temperature for at least 5 minutes prior to applying another layer, in particular for 10 to 20 minutes.

The component's surface covered by the aluminium-based coating can be formed by a permanent aluminium-wettable material, for example a material comprising a refractory boride, in have been described in the abovementioned U.S. Pat. Nos. 5,310,476, 5,364,513, 5,651,874 and 6,436,250.

The permanent aluminium-wettable layer may contain an aluminium-wetting agent, such as an oxide of iron, nickel or copper. Suitable agents and materials are disclosed in the abovementioned WO01/42168, WO01/42531 and WO02/096831. In one embodiment, the component comprises a layer of the permanent aluminium-wettable material on a conductive component body, in particular a carbon body. In any case, the use of this aluminium-based coating on an aluminium-wettable surface provides a well wetted surface upon heat treatment. Moreover, when the surface has some porosity, the wetting by aluminium extends also into the surface.

When the component is subsequently exposed to molten aluminium during use, the components surface is already properly wetted by molten aluminium. The actual wetting of the component can be made in a controlled environment and manner before use.

The component can be a component of an aluminium electrowinning cell which during use is exposed to molten aluminium and/or electrolyte, for example a cathode or part of a cell bottom or a sidewall.

The component can be a component of an apparatus for treating molten aluminium and during use is exposed to molten aluminium, for example a stirrer or pipe or a vessel for containing the molten metal.

Examples of components which benefit from having an aluminium-wetted surface are disclosed in the abovementioned WO01/42168, WO01/42531 and WO02/096831.

Another aspect of the invention relates to a method of manufacturing an apparatus which during use contains molten aluminium. The method comprises manufacturing a component having aluminium-based protective coating by the method described above and placing this component into said apparatus.

When the apparatus is an aluminium electrowinning cell, this component can be a cathode, part of a cell bottom or part of a cell sidewall. When the apparatus is designed for treating molten aluminium, this component can be a stirrer or a vessel placed into the apparatus.

A further aspect of the invention relates to a method for producing aluminium. The method comprises manufacturing an aluminium electrowinning cell having an aluminium-wetted component as above, cathodically reducing aluminium which comes into contact with the aluminium-wetted component. Aluminium may be produced on a drained surface of a cathodic component, in particular an inclined or vertical drained surface.

Suitable cathode and cell configurations are for example disclosed in U.S. Pat. Nos. 5,472,578, 5,683,559, 6,093,394, 6,436,273, 6,638,412, 6,682,643, 6,692,620, 6,783,656 and in WO02/070783, WO02/070785, WO02/097168, WO02/097169, WO03/023091 and WO03/023092 (all assigned to MOLTECH Invent S.A.).

Another aspect of the invention relates to a method of treating aluminium, comprising manufacturing an apparatus for treating molten aluminium as above, stirring molten aluminium with the stirrer or holding molten aluminium within the vessel. Examples of such apparatus are disclosed in WO00/63630 and WO01/42168 (both assigned to MOLTECH Invent S.A.).

Yet a further aspect of the invention relates to a part manufactured aluminium-based protective coating on a component. The part-manufactured coating comprising one or more dried layers of a slurry as described above.

Yet another aspect of the invention relates to an aluminium-based protective coating on a component. This coating comprises a mixture of aluminium oxide, metal aluminium and another metal and protecting the component against chemical attack. The coating is formed by one or more layers heat treated layers applied from a slurry as described above.

The invention will be further described in the following examples.

EXAMPLE 1

An aluminium-based slurry according to the invention was produced by mixing: 20 wt % aluminium particles; 70 wt % colloidal silica (NIACOL 830); and 10 wt % of a polyvinyl alcohol (PM 47,000) solution. The aluminium particles had a size of 200 mesh and were encapsulated in an organic coating. The colloidal silica contained 30 wt % $SiO_2$ which is reactable with the aluminium when exposed to heat, to form a mixture of alumina, aluminium and silicon metal. The polyvinyl alcohol solution contained 5% polyvinyl alcohol in water.

The slurry's pH was adjusted to a value of about 10.5 so as to prevent dissolution of the aluminium particles into the slurry and oxidation of the aluminium by the environment before use instead of its reaction with the silica.

This slurry can be used to produce an aluminium-based layer on a component as described in Example 3.

EXAMPLE 1a

In a variation, the aluminium particles of the slurry of Example 1 were encapsulated in an oxygen impervious material before incorporation into the slurry to further inhibit oxidation of the aluminium particles prior to heat treatment.

The encapsulation was achieved by spraying an aqueous solution of 1 to 5 w % of polyvinyl alcohol having a molecular weight between 20,000 and 45,000.

Alternatively, The polyvinyl alcohol can be replaced or combined with other water soluble organic polymers such as a polymer of the acrylic family.

The encapsulation operation was carried out at room temperature by using an air flow containing the polyvinyl alcohol solution so as to create a fluidizing bed of the aluminium particles. An amount of 2 to 5 volume % of the spraying solution was injected into this air flow. After 10 to 20 minutes, injection of the spraying solution into the air flow was stopped but the fluidization process with this air flow was continued for about 15 to 20 minutes to dry the encapsulating envelops formed on aluminium particles.

Upon encapsulation, the aluminium particles were protected by a thin film of about 0.1 to 0.4 microns of polyvinyl alcohol, and could be stored at room temperature for an extended period of time without any oxidation.

EXAMPLE 2

A slurry for producing a permanent aluminium-wettable coating on a component, in particular a carbon component, which can be covered with a slurry-applied layer according to the invention, was prepared as follows.

A refractory hard metal boride consisting of 47.5 g surface-oxidized particulate spherical $TiB_2$ (−325 mesh) having a $TiO_2$ surface film and a particulate reinforcing metal oxide in the form of 2.5 g $TiO_2$ (−325 mesh) were stirred and suspended in a colloidal carrier consisting of 20 ml colloidal $Al_2O_3$ (NYACOL® Al-20, a milky liquid with a colloidal particle size of about 40 to 60 nanometer) to form a colloidal slurry.

After the particulate titanium diboride and oxide had been suspended in the colloidal carrier, an amount of 1 ml of an aqueous solution containing 15 weight % polyvinyl alcohol (PVA) was added to the colloidal slurry.

This slurry produces upon heat treatment an oxide matrix of titanium-aluminium mixed oxide from the reaction of the colloidal oxide $Al_2O_3$ and $TiO_2$ present as suspended oxide particles and as an oxide film covering the suspended $TiB_2$ particles. Further details of this material, as disclosed in WO02/096831.

EXAMPLE 3

A graphite aluminium electrowinning cathode was coated with eight aluminium-wettable layers obtained by painting layers of the slurry of Example 2 to form a permanent aluminium-wettable coating. Each applied layer was allowed to dry for 30 minutes before application of the next layer. The eight layers had a cumulated thickness of about 1.8 mm.

The permanent aluminium-wettable layers were then covered with an aluminium-based coating according to the invention. The aluminium-based coating was formed by applying three temporary aluminium-based layers obtained by painting layers of the slurry of Example 1 or 1a onto the permanent coating. Each applied layer was allowed to dry in air for about 15 minutes before applying the next layer. The aluminium-based layers had a total thickness of about 0.4 to 0.5 mm.

Such a cathode, when subjected to a heat treatment forms an aluminium-based surface layer on the permanent aluminium-wettable refractory coating as described in Example 4.

EXAMPLE 4

The cathode according to the invention of Example 3 was tested in an aluminium electrowinning test cell.

The cell contained an electrolyte at 930° C. made of 62.4 wt % $Na_3AlF_6$, 11 wt % NaF, 7 wt % KF, 4% wt % CaF and 9.6 wt % $Al_2O_3$. The cathode was preheated above the electrolyte for 15 min. to reach a temperature of about 900° C. whereby freezing of the electrolyte by immersion of the cathode can be avoided. During the preheating, the permanent aluminium wettable coating underwent consolidation. In the aluminium-based coating, the aluminium reacted with the $SiO_2$ particles from the colloid to produce a homogeneous mixture of alumina, aluminium and silicon forming a pre-aluminization of the cathode's surface before use.

The pre-heated and aluminium-wetted cathode was immersed into the electrolyte and held in a nearly upright position to face a correspondingly orientated anode. An electrolysis current was passed at the cathode's surface at a current density of 0.7 $A/cm^2$ to the anode. During use, the cathode remained aluminium-wetted and operated in a drained configuration.

After one hundred hours, the cathode was removed from the cell. The cathode was covered with a bright and shiny layer of aluminium which slowly oxidized during cooling in air. A cross-section of the cathode showed that the permanent aluminium-wettable coating was covered with a surface oxidized aluminium layer and thoroughly impregnated with aluminium.

Hence, the pre-aluminization of the permanent coating provided by the use of the aluminium-based coating according to the invention led to a continuous and full and durable wetting of the permanent coating with molten aluminium even through the aluminized cathode surface was held in a nearly upright position during use.

This aluminium-based coating also protected the permanent aluminium-wettable coating before exposure to molten aluminium and against oxidation and prevented formation of aluminium-repellent oxides, i.e. during the preheating and during immersion into the electrolyte.

The invention claimed is:

1. A slurry for forming an aluminum-based protective coating on a component, said slurry comprising suspended aluminum particles in a colloid having dispersed colloidal particles of a metal oxide or a metal oxide precursor such as a hydroxide, wherein the term "metal" of said metal oxide as used herein includes also the metalloid silicon, said metal oxide being reducible by metallic aluminum, said slurry having such a basic pH that dissolution of the aluminum particles in the slurry is inhibited to maintain the suspended aluminum particles as undissolved aluminum particles in the slurry, whereby when the slurry is subjected to a heat treatment, the undissolved aluminum particles are reactable with the colloidal particles to form an aluminum-based mixture resistant to chemical attack made of aluminum oxide, metal aluminum and the metal of said colloidal particles.

2. The slurry of claim 1, which has a pH of at least 9 or 9.5, in particular at least 10.

3. The slurry of claim 2, which has a pH of up to 11.5, in particular up to 11.

4. The slurry of any preceding claim, wherein the metal of the colloidal particles is selected from nickel, cobalt, iron, silicon, yttrium, cerium and thorium, or a mixture thereof.

5. The slurry of claim 1, wherein the aluminum particles are encapsulated by an oxygen impervious material, in particular an acrylic material, to inhibit oxidation of the aluminum particles prior to heat treatment.

6. The slurry of claim 1, wherein said slurry is applied as dried layers that contain: 30 to 70 wt % aluminum particles; and 0 to 2 wt % additives, the balance being the colloidal particles.

7. The slurry of claim 6, wherein the dried layers contain 35 to 65 wt % aluminum, in particular 40 to 60 wt % such as 45 to 55 wt %.

8. The slurry of claim 6, wherein the additives comprise at least one organic compound selected from ethylene glycol, hexanol, polyvinyl alcohol, polyvinyl acetate, polyacrylic acid, hydroxy propyl methyl cellulose and ammonium polymethacrylate and mixtures thereof.

9. A method of forming an aluminum-based protective coating on a component, comprising the steps of:
providing a basic slurry as defined in claim 1 containing aluminum particles and colloidal particles of a metal oxide;
applying one or more layers of the slurry to a surface of the component; and
drying the applied layer(s) to form the aluminum-based coating on the component,
said aluminum particles and colloidal metal oxide particles being reactable during heat treatment before and/or during use of the component to form an aluminum-based mixture resistant to chemical attack made of aluminum oxide, metal aluminum and the metal of said colloidal particles on the component.

10. The method of claim 9, wherein the applied layers have a total thickness in the range of 0.2 to 1 mm, in particular 0.4 to 0.7 mm.

11. The method of claim 9, comprising applying 2 to 5 layers of the slurry to the component surface.

12. The method of claims 9, comprising applying a plurality of layers of the slurry, each layer being allowed to dry in air at ambient temperature for at least 5 minutes prior to applying another layer, in particular for 10 to 20 minutes.

13. The method claims 9, wherein the component surface covered by the aluminum-based coating is formed by a permanent aluminum-wettable material.

14. The method of claim 13, wherein the permanent aluminum-wettable material comprises a refractory boride, in particular titanium diboride.

15. The method of claim 13, wherein the permanent aluminum-wettable layer comprises an aluminum-wetting agent, such as an oxide of iron, nickel or copper.

16. The method of claims 13, wherein the component comprises a layer of the permanent aluminum-wettable material on a conductive component body, in particular a carbon body.

17. The method of claims 9, wherein the component is a component of an aluminum electrowinning cell which during use is exposed to molten aluminum and/or electrolyte.

18. The method of claims 9, wherein the component is a component of an apparatus for treating molten aluminum and during use is exposed to molten aluminum.

19. A method of manufacturing an apparatus which during use contains molten aluminum, said method comprising manufacturing a component having aluminum-based protective coating by the method of claim 9 and placing said component into said apparatus.

20. The method of claim 19, wherein said component is a cathodic component or a sidewall placed into an aluminum electrowinning cell.

21. The method of claim 19, wherein said component is a stirrer or a vessel placed into an apparatus for treating molten aluminum.

22. A method of treating aluminum, comprising manufacturing by the method of claim 21 an apparatus for treating molten aluminum, stirring molten aluminum with said stirrer or holding molten aluminum within said vessel.

23. A method of producing aluminum, comprising manufacturing by the method of claim 19 an aluminum electrowinning cell with an aluminum-wetted component, cathodically reducing aluminum which comes into contact with said component.

24. The method of claim 23, comprising producing aluminum on a drained surface of an aluminum-wetted cathodic component, in particular an inclined or vertical drained surface.

25. A part manufactured aluminum-based protective coating on a component, said part-manufactured coating comprising one or more dried layers of a slurry as defined in claim 1.

* * * * *